UNITED STATES PATENT OFFICE 2,324,302

STABLE-COLORED CRYSTALLINE ALKALI METAL HYPOCHLORITE - CONTAINING COMPOSITION

Harry H. Hull, Chicago Heights, Ill., assignor to The Diversey Corporation, a corporation of Illinois No Drawing. Application May 31, 1940, Serial No. 338,232

4 Claims. (Cl. 252—99)

One of the most commonly used detergent-sterilizing compositions is a solution of crystalline alkali metal hypochlorite material such as the crystalline composition formed by combining trisodium phosphate with sodium hypochlorite. This composition has generally from 3% to 5% of available chlorine and is used extensively for cleaning and disinfecting dairy equipment, dishes and other food dispensing or containing equipment. The sodium hypochlorite-trisodium phosphate complex is a white material resembling sugar, salt, and other white crystalline materials commonly used in dairies, restaurants, etc., and occasionally the crystalline materials are confused and used in the wrong place.

In accordance with this invention, the trisodium phosphate-sodium hypochlorite complex, or other similar hypochlorite-containing composition, is given a distinctive color which identifies it from all the common crystalline materials usable in food products. Sodium hypochlorite is of course a very powerful bleaching agent and ordinary dyes and coloring matter cannot be employed in order to impart a distinctive color because they are quickly bleached by the action of the chlorine.

It has been found that the color imparted by potassium permanganate or other alkali permanganate will persist even in the presence of sodium hypochlorite and will impart a distinctive color to the crystals. If the potassium permanganate is physically mixed in the ordinary manner with the alkali metal hypochlorite material, however, the amount required to produce a distinctive color is so great that, when dissolved, the detergent solution has a staining effect upon materials with which it comes in contact.

It has now been discovered that a complex solid solution can be produced from a trisodium phosphate, alkali metal hypochlorite, and alkali permanganates, which has a highly distinctive color without the employment of a large proportion of permanganate.

The permanganate compounds will dissolve, react, or combine in any proportion up to about 8% with trisodium phosphate during its manufacture to give a crystalline trisodium phosphate containing sodium permanganate in solid solution or in complex combination with the trisodium phosphate. The precise amount of permanganate which can thus be held depends of course upon the amount of other complex forming substances present in the trisodium phosphate, but in all cases a sufficient amount of permanganate can be held to produce a distinctly colored crystal.

I do not understand the exact nature of the combination between trisodium phosphate and the alkali metal permanganates, but it appears that the permanganate is dissolved in the solid crystalline trisodium phosphate giving a colored crystal, the color intensity of which varies according to the amount of permanganate in the crystalline composition. As little as 0.01% will give the crystals a decidedly pink color while 7.00% will produce an extremely dark purple color, rendering the crystals substantially opaque to transmitted light. Due to the fact that these colors are stable in the presence of available chlorine, it is possible to produce colored hypochlorite-containing compositions either in the form of solutions or as solid crystalline products.

A suitable product may be made substantially in accordance with the process of United States Patent 1,965,304, except that a suitable amount of an alkali metal permangante is introduced into the batch prior to the actual crystallization of the final product. As an example, 700 lbs. of partially anhydrous disodium phosphate (equivalent to 440 lbs. of the disodium phosphate) and 215 lbs. of 46.5% caustic soda were melted together in a tank by means of steam coils. The water content of the charge was then adjusted so that it had a Bé. gravity strength of 56.5° at 105° C. The charge was then transferred to a mixing tub and 310 lbs. of a strong sodium hypochlorite solution containing 15.0% available chlorine, 3% free caustic, and 0.25 lb. of sodium permanganate was added quickly to the molten phosphate and the mixture rapidly agitated until crystallization took place and the mass thoroughly disintegrated. Agitation was continued until the mass had cooled to below 35° C. The product had an alkalinity ratio of 0.96 and contained 3.92% available chlorine and 0.02% sodium permanganate in stable combination. The product had a distinct pink color. A mechanically mixed dry trisodium phosphate-sodium hypochlorite compound and sodium permanganate would require at least 50 times as much permanganate to obtain an appreciable color effect in the mixture.

The above example illustrates a batch process whereby a substantially dry finished product is obtained without the production of mother liquors. By regulation of the liquor concentration, temperature and mechanical conditions, it is also practicable to produce large, well defined, colored crystals of a uniform product by crystallization from a solution with the production of a mother liquor which may be returned to the process as a crystallizing medium for the next batch of crystals.

Since the sodium permanganate will form addition products with trisodium phosphate, it is possible to also produce homogeneously colored crystals of trisodium phosphate by including a small amount of a permanganate in the hot trisodium phosphate liquors prior to crystallization. The major advantage in this procedure is the fact that a colored salt may be obtained with the introduction of only a trace of the permanganate coloring matter. With the introduction of larger amounts of the permanganate the product becomes a good disinfecting agent though not as effective as the hypochlorite containing composition.

The maximum amount of permanganate which may be introduced depends upon other complex-forming substances present in the material, as already stated. For example, excess caustic soda over that necessary to give trisodium phosphate of the formula $Na_3PO_4$ or the presence of sodium hypochlorite in the complex will reduce the amount of permanganate which will enter the complex to a point below the 8% figure mentioned before. For example, a product containing no excess caustic soda was made having a 7.16% content of sodium permanganate, whereas a product containing sufficient sodium hypochlorite to give an available chlorine content of 0.77%, without excess caustic soda, was treated with the same amount of sodium permanganate and gave a final product containing only 4.34% sodium permanganate. In another case 1500 cc. of a hot 37° Bé. gravity strength trisodium phosphate liquor having an alkalinity ratio of 1.07 was treated with 100 cc. of water and 37.5 grams of potassium permanganate and the product allowed to crystallize. The crystal product contained 1.40% of $MnO_4$ calculated as $NaMnO_4$. In a similar case where the alkalinity ratio of the starting solution was 0.924 the final crystalline product contained 4.80% $MnO_4$ calculated as $NaMnO_4$. The difference in these two cases was that in the first case a definite excess of caustic soda was present whereas in the second case the product did not contain sufficient caustic soda to satisfy the formula, $Na_3PO_4$.

The meaning of the term "alkalinity ratio" in these two cases refers to the ratio of total caustic base present to the total theoretically present in trisodium phosphate of the theoretical formula $Na_3PO_4$, disregarding the amount of crystal water. The "alkalinity ratio" is determined by the formula $$\text{Alkalinity ratio} = \frac{2\ T_{m.o.} - T_{ph.}}{3\ (T_{m.o.} - T_{ph.})}$$

where $T_{m.o.}$ is the titration to methyl orange and $T_{ph.}$ is the titration to phenolphthalein using standard fifth normal hydrochloric acid as the reagent.

The "alkalinity ratio" is important only where large amounts of the additive agent are to be introduced. For example, as pointed out in the cited United States Patent 1,965,304 an alkalinity ratio slightly below 1.00 is highly desirable where a stable product of high available chlorine content is to be produced. This condition is also desirable when producing the trisodium phosphate sodium hypochlorite-sodium permanganate compound, but is not critical when simply producing a colored trisodium phosphate-permanganate compound. However, if the maximum amount of permanganate is to be introduced into the trisodium phosphate, the alkalinity ratio should be held at one, or slightly less.

The preferred range of permanganate is from approximately 0.01% to 0.10% which is ordinarily used with an available chlorine content of about 4%.

The foregoing detailed description has geen given for clearness of understanding only, and no unnecessary limitations should be understood therefrom.

What I claim as new, and desire to secure by Letters Patent, is:

1. A composition of matter comprising a crystalline complex of trisodium phosphate, sodium permanganate, and sodium hypochlorite, the alkalinity ratio being approximately 1, the total of available chlorine and permanganate being not more than 8%, and the available chlorine content being not more than approximately 5%.

2. The method of coloring a trisodium phosphate-sodium hypochlorite complex which comprises introducing a small amount of an alkali metal permanganate into an aqueous solution consisting essentially of water, trisodium phosphate and sodium hypochlorite in proportions to form a trisodium phosphate-sodium hypochlorite compound containing not more than approximately 5% available chlorine, and crystallizing the complex from such solution.

3. A composition of matter consisting essentially of a complex crystal of trisodium phosphate and sodium hypochlorite including a small percentage of an alkali metal permanganate inherently dissolved in the crystal, the permanganate being present in an amount not substantially more than 8% of the total, the crystal being uniformly colored by the permanganate to at least a pink color of a shade markedly darker than would be produced by the same quantity of undissolved permanganate and the amount of available chlorine being not more than approximately 5%.

4. A composition of matter consisting essentially of a complex crystal of trisodium phosphate and sodium hypochlorite including a small percentage of an alkali metal permanganate inherently dissolved in the crystal, the permanganate being present in an amount from 0.01% to 0.10%, and the amount of available chlorine being approximately 4%.

HARRY H. HULL.